UNITED STATES PATENT OFFICE.

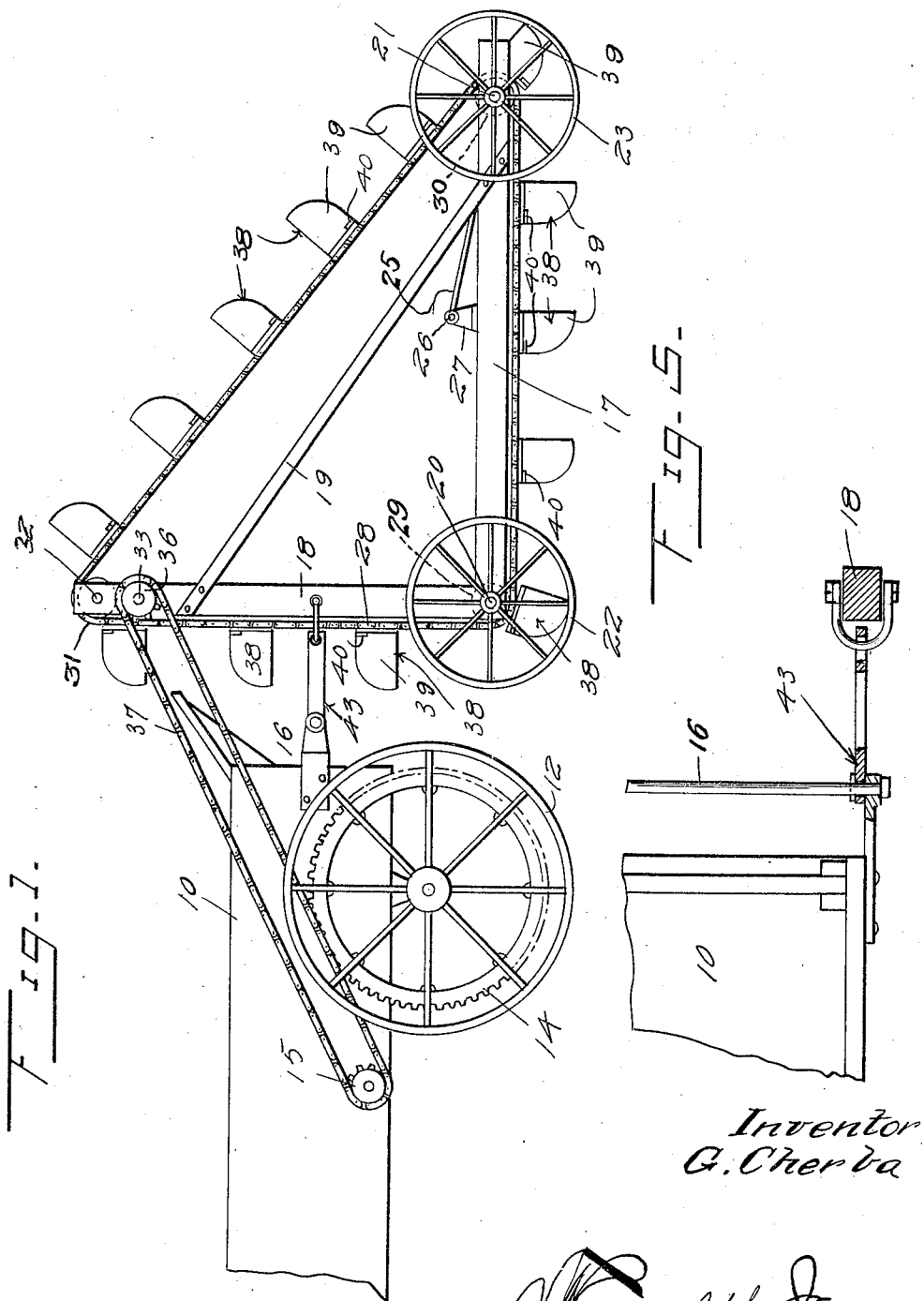

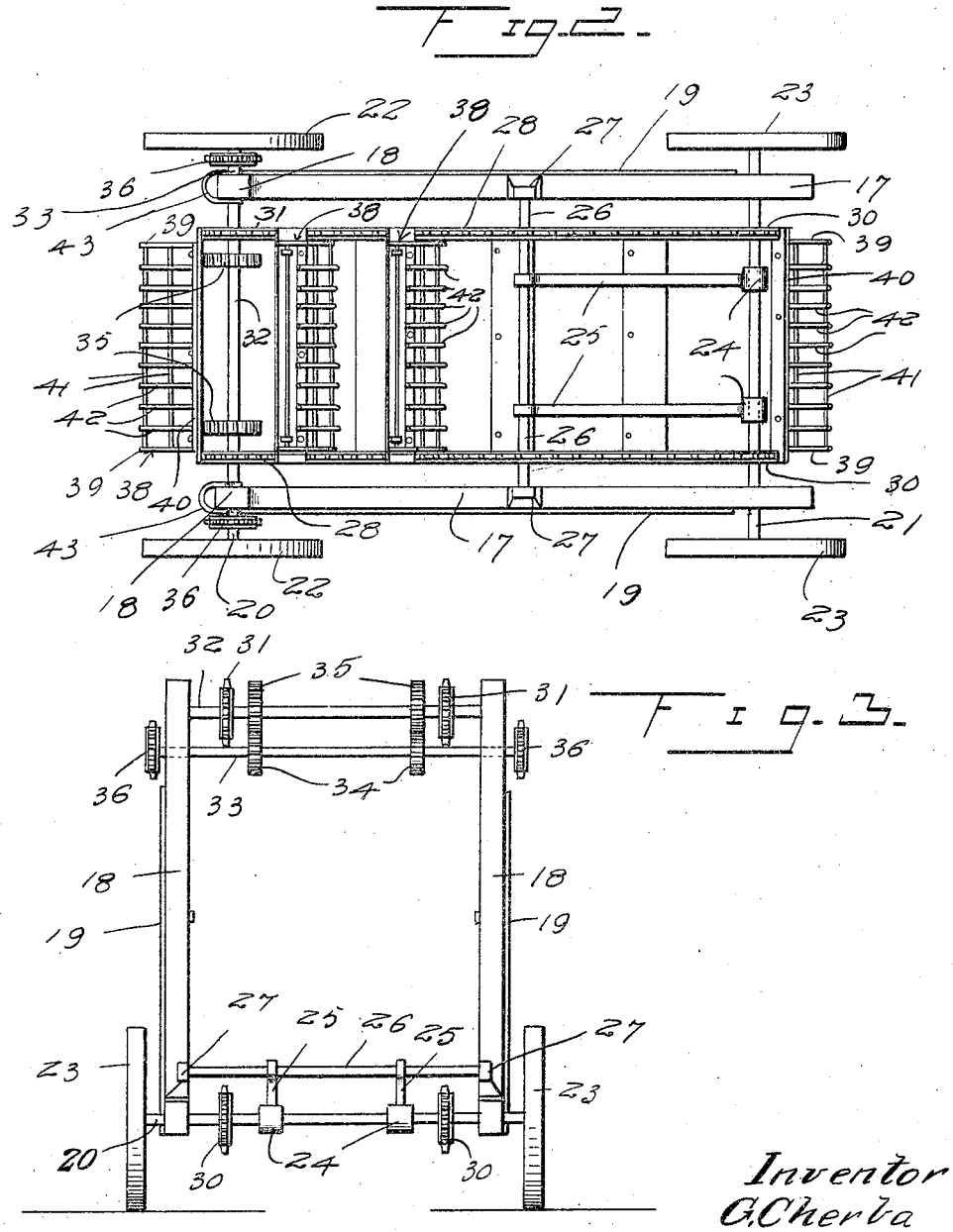

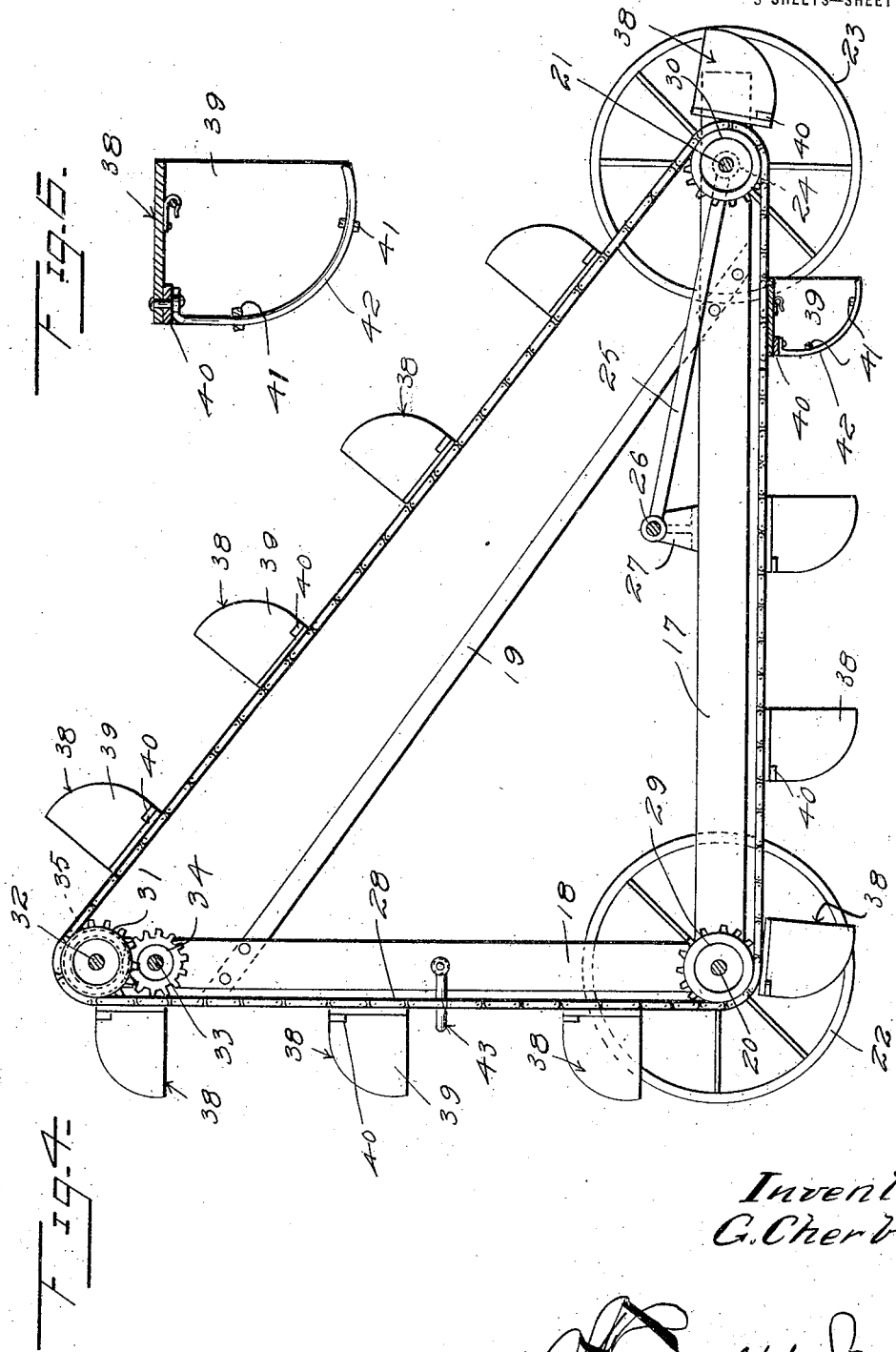

GEORGE CHERBA, OF JEDDO, PENNSYLVANIA.

STONE-PICKER.

1,374,489. Specification of Letters Patent. Patented Apr. 12, 1921.

Application filed December 27, 1919. Serial No. 347,674.

*To all whom it may concern:*

Be it known that I, GEORGE CHERBA, a citizen of the United States, residing at Jeddo, in the county of Luzerne and State of Pennsylvania, have invented certain new and useful Improvements in Stone-Pickers; and I do hereby declare the following to be a full, clear, and exact description of the invention, such as will enable others skilled in the art to which it appertains to make and use the same.

This invention relates to an improved stone picker for use in gathering stones from a field and one object of the invention is to provide a stone picker so constructed that it may be connected with a wagon and trail behind the wagon as the wagon is drawn across a field.

Another object of the invention is to so construct this picker that an endless gathering and conveying element forming part of the picker may be operated from the rear wheels of the wagon.

Another object of the invention is to so construct this picker that it may be releasably connected with the wagon thus permitting it to be disconnected from the wagon after the wagon body has been filled with stone.

Another object of the invention is to so construct the scrapers that they may pick up the stones from the field without carrying the loose dirt with the stones.

Another object of the invention is to so construct this picker that it will be simple in construction and very efficient in operation.

This invention is illustrated in the accompanying drawings, wherein:

Figure 1 is a view in side elevation showing the improved picker connected with a dump wagon.

Fig. 2 is a top plan view of the improved picker.

Fig. 3 is a rear view showing the frame of the improved picker in end elevation.

Fig. 4 is a vertical longitudinal sectional view through the picker.

Fig. 5 is a transverse sectional view showing the means for releasably connecting the picker with the wagon.

Fig. 6 is an enlarged view of one of the scrapers.

This improved picker is used in connection with a dump wagon having a conventional construction and provided with the usual body 10, and rear wheels 12. It is of course understood that this is only one type of wagon with which the picker may be used and that it may be associated with other types of wagons if so desired. In order to permit the picker to be used in connection with the wagon it is only necessary to provide a large sprocket wheel 14 on each rear wheel, a small idler sprocket wheel 15 at each side of the wagon body, and a bracket at each side of the body so that the elongated securing pin or bolt 16 may be mounted transversely of the body. It is of course obvious that if desired separate bolts could be provided instead of a single bolt.

The stone picker is provided with a frame structure having lower side bars 17 from which extend vertical standards 18 braced by diagonally extending braces 19. Forward and rear axles or shafts 20 and 21 are carried by the horizontally extending side bars 17 and carry wheels 22 and 23, the rear shaft 21 passing through collars 24 carried by arms 25 mounted upon the cross bar 26. This cross bar 26 extends transversely of the frame and is carried by supporting arms 27 which extend upwardly from the side bars 17.

The picking mechanism is of the endless type and is provided with side chains 28 which pass about sprocket wheels 29 and 30 mounted upon the shafts or axles 20 and 21 and also pass about the sprocket wheels 31 mounted upon the driven shaft 32 journaled in the upper portions of the standards 18. A driving shaft 33 is rotatably supported by the standards beneath the shaft 32 and carries gears 34 which mesh with gears 35 carried by the driven shaft thus permitting rotary movement to be transmitted from the driving shaft to the driven shaft. The end portions of the driving shaft extend beyond the standards 18 and sprocket wheels 36 are mounted upon the extended end portions of this driving shaft and are engaged by sprocket chains 37 which pass about the idler sprocket wheel 15 and have their lower flights engaged by the large sprocket wheels 14 carried by the rear wheels 12 of the wagon. It will thus be seen that as the wagon is drawn across the field rotary movement will be transmitted from the wagon wheel to the driving shaft and from the driving shaft to the driven shaft and further that when this machine is being drawn across a field the side chains 28 will be moved to bring the scrapers into engagement with the ground and then carry the scrapers upwardly to deposit stones into the wagon.

The scrapers are carried by the side chains to extend transversely between them and are indicated in general by the numeral 38. One of these scrapers is shown in detail in Fig. 6 and from an inspection of this figure it will be seen that the scraper is provided with side plates 39 which are connected by a cross bar or head 40 connected with links of the side chains. These side plates carry rods 41 which support and brace the teeth or tines 42 extending from the cross bar 40. It will thus be seen that as the chains move the scrapers will be brought into engagement with the ground and will pass slightly beneath the upper surface thereof. In moving rearwardly stones and large lumps of dirt which have dried and become hard will be taken up by the scrapers. Upon reaching the rear end of the frame the scrapers will be carried upwardly to the upper end of the frame and as the scrapers pass over the wheels 31 the stones and hard lumps of earth will be thrown into the wagon body. When the wagon is filled the bolt 16 may be withdrawn thus releasing the arm 43 and the chains 37 will then be disconnected from the sprocket wheels 15. The wagon will thus be disconnected from the stone picker and the stone picker may then be left in the field while the stones are carried to a point of disposal. After all the stones have been removed from the field the stone picker may be conveyed to a barn or other place of storage. If desired clutches may be provided so that the picker may be rendered inoperative when the machine is being moved to a place of storage. There has thus been provided a very efficient stone picker of simple construction.

What is claimed is:—

1. The combination with a vehicle including a body and rear supporting wheels, of driving sprockets carried by the supporting wheels, idler sprockets carried by said body, a frame positioned to the rear of the vehicle and releasably connected therewith, axles carried by said frame, supporting wheels upon said axles, a driving shaft rotatably carried by said frame, a driven shaft carried by the frame and rotated from the driving shaft, an endless gathering and conveying element passing about the driven shaft and axles, sprocket wheels carried by the driving shaft, and sprocket chains passing about the sprocket wheels of the driving shaft and vehicle body and engaging the sprocket wheels of the vehicle supporting wheels.

2. The combination with a vehicle including a body, and rear supporting wheels for the body, of a stone picker comprising a frame positioned to the rear of the vehicle body, an endless stone picking and conveying element movably associated with the frame for removing stones from the ground and conveying the stones upwardly and depositing the same in the vehicle body, a driving shaft for the picking element rotatably carried by said frame, sprockets carried by the driving shaft, idler sprockets carried by the vehicle body, sprocket chains passing about the sprocket wheels of the driving shaft and the vehicle body, and driving sprockets carried by the vehicle wheels and engaging the sprocket chains.

3. A stone picker comprising a frame having longitudinally extending side bars, vertically extending standards positioned at the forward ends of the side bars, front and rear axles carried by the side bars, supporting arms extending upwardly intermediate the length of the side bars, a cross bar carried by the supporting arms, bearing arms carried by the cross bar and extending rearwardly and terminating in bearings engaging the rear axle, a driven shaft rotatably supported by said standards, an endless picking and conveying element extending about the driven shaft and axles, and a driving shaft carried by the standards and having connection with the driven shaft for imparting rotary movement to the same.

4. A stone picker comprising a frame having side bars, vertical standards carried by the side bars, a driven shaft carried by the standards, axles carried by the forward and rear end portions of the side bars, sprocket wheels positioned upon the driven shaft and axles, an endless picking element having side chains passing about the sprocket wheels of the driven shaft and axles, and buckets positioned upon the side chains and having prongs positioned in spaced relation for engaging stones in a field as the buckets move rearwardly beneath the frame and lifting the stones from the field when the buckets reach the rear end of the frame and move upwardly.

In testimony whereof I affix my signature in presence of two witnesses.

GEORGE CHERBA.

Witnesses:
JOHN SHIGO,
G. J. BRUGER.